(12) United States Patent
Nielsen

(10) Patent No.: US 10,639,856 B2
(45) Date of Patent: May 5, 2020

(54) METHOD AND APPARATUS FOR MANUFACTURING A PART OF A WIND TURBINE BLADE

(71) Applicant: LM WP PATENT HOLDING A/S, Kolding (DK)

(72) Inventor: Lars Nielsen, Skanderborg (DK)

(73) Assignee: LM WP PATENT HOLDING A/S, Kolding (DK)

( * ) Notice: Subject to any disclaimer, the term of this patent is extended or adjusted under 35 U.S.C. 154(b) by 285 days.

(21) Appl. No.: 15/300,994

(22) PCT Filed: Mar. 30, 2015

(86) PCT No.: PCT/EP2015/056876
§ 371 (c)(1),
(2) Date: Sep. 30, 2016

(87) PCT Pub. No.: WO2015/150317
PCT Pub. Date: Oct. 8, 2015

(65) Prior Publication Data
US 2017/0036406 A1 Feb. 9, 2017

(30) Foreign Application Priority Data
Apr. 2, 2014 (EP) .................................. 14163192

(51) Int. Cl.
*B29C 70/52* (2006.01)
*F03D 1/06* (2006.01)
(Continued)

(52) U.S. Cl.
CPC .......... *B29C 70/526* (2013.01); *B29C 70/525* (2013.01); *B29D 99/0025* (2013.01);
(Continued)

(58) Field of Classification Search
CPC ... B29C 70/525; B29C 70/526; B29C 70/528; B29D 99/007; B29D 99/0025;
(Continued)

(56) References Cited

U.S. PATENT DOCUMENTS 5,476,704 A 12/1995 Kohler
5,820,804 A * 10/1998 Elmaleh ................ B29C 33/308
264/167

(Continued)

FOREIGN PATENT DOCUMENTS

DE 10 2011 100 546 A1 11/2012
EP 0 561 151 A1 9/1993
(Continued)

*Primary Examiner* — Michael A Tolin
(74) *Attorney, Agent, or Firm* — Nath, Goldberg & Meyer; Jerald L. Meyer; Tanya E. Harkins

(57) ABSTRACT

A method for manufacturing a part for a wind turbine blade, and in particular a part of a shear web for a wind turbine blade, is described. The method comprises pultruding the part, wherein an in-line shaping of the part is performed, to provide a part having a cross-sectional profile which varies in the longitudinal length of the part. Providing a shear web having a portion which varies in cross-sectional profile results in production of a wind turbine blade part which can be accurately controlled to have precise geometrical profile corresponding to a desired blade profile, with minimal waste of materials.

10 Claims, 7 Drawing Sheets

(51) Int. Cl.
*B29D 99/00* (2010.01)
*B29L 31/08* (2006.01)
*B29L 31/00* (2006.01)

(52) U.S. Cl.
CPC ....... *B29D 99/0028* (2013.01); *F03D 1/0675* (2013.01); *B29C 70/528* (2013.01); *B29D 99/0007* (2013.01); *B29L 2031/003* (2013.01); *B29L 2031/085* (2013.01)

(58) Field of Classification Search
CPC ........... B29D 99/0028; B29L 2031/003; B29L 2031/008; B29L 2031/085; F03D 1/0675
See application file for complete search history.

(56) References Cited

U.S. PATENT DOCUMENTS

| | | | |
|---|---|---|---|
| 8,393,871 B2* | 3/2013 | Yarbrough | F03D 1/065 416/226 |
| 2013/0105072 A1* | 5/2013 | Anderson | B29C 70/526 156/264 |
| 2013/0189482 A1 | 7/2013 | Dequine | |

FOREIGN PATENT DOCUMENTS

| | | | | |
|---|---|---|---|---|
| EP | 2 679 804 A1 | 1/2014 | | |
| WO | WO-2013092871 A1 * | 6/2013 | ........... | F03D 1/0633 |

* cited by examiner

METHOD AND APPARATUS FOR MANUFACTURING A PART OF A WIND TURBINE BLADE

This is a National Phase Application filed under 35 U.S.C. 371 as a national stage of PCT/EP2015/056876, filed Mar. 30, 2015, an application claiming the benefit of European Application No. 14163192.9, filed Apr. 2, 2014, the content of each of which is hereby incorporated by reference in its entirety.

FIELD OF THE INVENTION

The present invention relates to a method and associated apparatus for manufacturing a part of a wind turbine blade.

BACKGROUND OF THE INVENTION

In an effort to increase levels of renewable power generation, wind turbine design is driven towards larger generation size, which often results in increasingly longer wind turbine blade length. Accordingly, as such wind turbine blades increase in size, this results in a corresponding increase in the complexity of the blade geometry, with modern wind turbine blades comprising different combinations of blade pre-bends, sweeps, and complex aerodynamic profile curvatures. Such relatively complicated structures introduce different constructional difficulties in the manufacture of components used in wind turbine blade assembly and production.

One such component is the shear web of a wind turbine blade. Shear webs are often provided as an element having an I- or C-shaped cross-section which extends between the internal surfaces of a shell of a wind turbine blade. Shear webs are generally provided as a shear web body, e.g. a sandwich panel construction, which extends between opposed web feet used to bond the shear web to the internal surfaces of the wind turbine blade.

It is known to manufacture such web feet by way of pultrusion. U.S. Pat. No. 5,476,704 describes a method of manufacturing a shear web for a wind turbine rotor, wherein the web foot of the shear web may be manufactured using pultrusion. The height of the shear web may be adjusted by machining or cutting of the web foot.

However, such a process results in considerable material waste, and does not easily allow for implementation in the relatively complex structures of modern wind turbine blades.

SUMMARY OF THE INVENTION

Accordingly, there is provided a method of manufacturing a part of a wind turbine blade, the part having a longitudinal length, the method comprising the steps of:
pultruding composite material through at least one die to form a part of a wind turbine blade having a cross-sectional profile; and
performing an in-line shaping of said part to adjust the cross-sectional profile of said part along at least a portion of the longitudinal length of the part,
wherein said in-line shaping comprises adjusting a pultrusion path for the composite material to provide a part of a wind turbine blade having a cross-sectional profile which varies along at least a portion of the longitudinal length of the part.

By performing an in-line shaping of the pultruded part, there is no excessive wastage of machined or cut parts. In addition, the geometry change can be accurately controlled and transitioned between longitudinal portions of the part. Such an accurately shaped part can be easily manufactured to correspond with the internal surface of a wind turbine blade shell, to which the part is to be attached.

Preferably, said in-line shaping comprises adjusting the profile of said at least one die to provide a part of a wind turbine blade having a cross-sectional profile which varies along at least a portion of the longitudinal length of the part.

Preferably, the method comprises the step of providing at least one die having at least one forming aperture, and wherein said step of performing an in-line shaping comprises adjusting the dimensions, shape, and/or orientation of said at least one forming aperture.

In one aspect, the shaping is preformed through the use of an adjustable die, preferably an adjustable pultrusion die which allows for the aperture profile of the die to be adjusted as required.

Additionally or alternatively, the method comprises the step of providing a guide flange having a profile to define the direction of a pultrusion path downstream of said at least one die, and wherein said step of in-line shaping comprises adjusting the profile and/or orientation of said guide flange to provide a part of a wind turbine blade having a cross-sectional profile which varies along at least a portion of the longitudinal length of the part.

Instead of, or in combination with, an adjustable die, an adjustable guide flange allows for the shaping of the pultruded part. Preferably, said guide flange acts on the profile of the pultruded part while the pultruded part is substantially compliant or malleable to allow re-shaping of the part profile. Accordingly, once the part is re-shaped, the part may be cured or hardened to fix the re-shaped profile.

Preferably, the method further comprises the step of heating said part, to allow for said in-line shaping of said part.

The heating may be arranged such that the part is maintained at a temperature to allow for a degree of re-shaping of the general cross-sectional profile of the part. The heating may be performed using a heating element provided along a portion of the pultrusion path for the composite material, preferably at and/or downstream of the initial die used to form the pultruded part.

Preferably, the method further comprises the step of:
curing the composite material to form said part, wherein said step of curing is performed simultaneous with and/or subsequent to said step of performing an in-line shaping of said part.

Preferably, the method comprises the steps of:
providing a pultrusion forming die arranged to produce a general cross-sectional profile for a part; and
providing an adjustable shaping die or an adjustable guide flange to provide adjustment of the cross-sectional profile of a part, said adjustable shaping die or adjustable guide flange arranged downstream of said forming die.

Providing a first pultrusion die and a second shaping die allows for the initial pultrusion of the part to be performed using an accurate die profile, subsequent to which the in-line shaping can be performed using the adjustable die.

Preferably, the method comprises the step of:
providing a curing system arranged to cure or harden pultruded material, said curing system arranged downstream of said adjustable shaping die or said adjustable guide flange.

Additionally or alternatively, the method comprises the step of:

providing an adjustable shaping die or adjustable guide flange having an integrated curing system.

Preferably, the step of providing a curing system comprises providing a cooling system. Preferably, the curing system comprises a water-cooled heat exchange system. Preferably, the curing system is provided as part of a water-cooled guide flange.

In one aspect, there is provided a method for manufacturing a part of a wind turbine blade, wherein the part comprises a first flange substantially defined along a first flange plane and a second flange substantially defined along a second flange plane, said second flange plane arranged substantially transverse to said first flange plane, and wherein said step of adjusting is performed such that the angle of said second flange plane is varied relative to the angle of said first flange plane along at least a portion of the longitudinal length of said part.

Preferably, said step of adjusting is performed such that that said second flange plane is varied in the range of approximately 75-105 degrees relative to said first flange plane, alternatively in the range of 80-100 degrees relative to said first flange plane.

Preferably, the method comprises the step of providing an adjustable die having a first aperture to form a first flange of a part of a wind turbine blade, and a second aperture to form a second flange of a part of a wind turbine blade, said first aperture defined along a first flange plane and said second aperture defined along a second flange plane, wherein said adjustable die is arranged to adjust the angle of said first aperture relative to said second aperture.

Additionally or alternatively, the adjustable die may be arranged to adjust the shape and/or dimensions of the first and/or second apertures.

Additionally or alternatively, the method comprises the step of providing an in-line shaping tool having an adjustable guide flange, wherein said adjustable guide flange is arranged to shape the orientation of the second flange of said part relative to the first flange of said part, wherein said adjustable guide flange is arranged to adjust the angle of said second flange relative to said first flange along the length of said part.

Preferably, the part comprises a web foot for a wind turbine shear web, wherein said first flange comprises a web foot flange, and wherein said second flange comprises a web connector flange.

Preferably, said second flange substantially defines a substantially U-shaped channel to receive a web body of a shear web. Preferably, said adjustable guide flange is received in said substantially U-shaped channel.

There is further provided a method of manufacturing at least a portion of a shear web for a wind turbine blade, the method comprising the steps of:
  selecting a wind turbine blade design defining a wind turbine blade, the wind turbine blade design having a cross-sectional profile which varies along a longitudinal extent of the wind turbine blade;
  providing a shear web continuous forming apparatus having at least one adjustable die;
  forming said at least a portion of a shear web using said forming apparatus;
  wherein the method further comprises the step of adjusting a pultrusion path for the composite material based on the cross-sectional profile of said wind turbine blade design, to provide said at least a portion of a shear web having a varying cross-sectional profile.

Preferably, said step of adjusting a pultrusion path for the composite material comprises adjusting said at least one adjustable die; adjusting a shaping die, and/or adjusting an adjustable guide flange.

Preferably, said wind turbine blade design defines an internal profile of a wind turbine blade, and wherein said step of adjusting comprises adjusting said at least one adjustable die based on the internal profile of the wind turbine blade, to provide said at least a portion of a shear web having a cross-sectional profile arranged to correspond with said internal profile of the wind turbine blade.

It will be understood that the internal profile of the wind turbine blade defines the location of internal surfaces of the wind turbine blade, and wherein the internal profile varies along a longitudinal extent of the wind turbine blade.

There is further provided a method of manufacturing at least a portion of a shear web for a wind turbine blade, the method comprising the steps of:
  selecting a desired shear web design for a wind turbine blade shear web, the shear web design having a cross-sectional profile which varies along a longitudinal extent of the shear web;
  providing a shear web continuous forming apparatus having at least one adjustable die;
  forming said at least a portion of a shear web using said forming apparatus;
  wherein the method further comprises the step of adjusting a pultrusion path for the composite material based on the varying cross-sectional profile of said desired shear web design to provide said at least a portion of a shear web having a varying cross-sectional profile.

Preferably, the method comprises the step of:
  providing an aerodynamic shape profile for a wind turbine blade;
  providing characteristic blade structural data for the wind turbine blade;
  calculating a desired shear web profile based on said shape profile and said characteristic data; and
  controlling said forming process based on said desired shear web profile.

It will be understood that said characteristic blade structural data may comprise data relating to one or all of the following: blade shell thickness data; desired bond line thickness; desired shear web length, height, depth.

Preferably, said shear web continuous forming apparatus comprises a pultrusion apparatus. Alternatively, an extrusion apparatus may be provided.

There is further provided a method of manufacturing a portion of a shear web for a wind turbine blade, the method comprising the steps of:
  manufacturing at least one web foot for a shear web as described above,
  attaching a shear web body to said at least one web foot for a shear web to form a shear web assembly for a wind turbine blade.

There is further provided a method of manufacturing at least a portion of a wind turbine blade comprising the steps of:
  manufacturing at least one part for a wind turbine blade as described above;
  providing at least one wind turbine blade shell; and
  attaching said at least one part to said at least one wind turbine shell to form at least a portion of a wind turbine blade.

There is further provided an apparatus for the manufacture of a part for a wind turbine blade, the apparatus comprising:

a continuous forming apparatus arranged to form a part for a wind turbine blade having a cross-sectional profile;

at least one shaping apparatus coupled to said continuous forming apparatus; and a controller coupled to said at least one shaping apparatus, wherein said controller is operable to adjust said at least one shaping apparatus to perform an in-line shaping of the cross-sectional profile of a part for a wind turbine blade.

Preferably, said continuous forming apparatus comprises at least one pultrusion die.

Preferably, the apparatus further comprises a curing system arranged to cure said part for a wind turbine blade, preferably arranged at and/or downstream of said at least one shaping apparatus. It will be understood that the curing system may comprise a cooling apparatus, e.g. a water-cooling system.

Preferably, said curing system is at least partly integrated in said at least one shaping apparatus.

Preferably, the apparatus further comprises a heating system arranged to heat said part for a wind turbine blade, preferably arranged at and/or downstream of said continuous forming apparatus, to allow for the in-line shaping of the said part.

In one aspect, said heating system is at least partly integrated in said at least one shaping apparatus.

Preferably, said controller is arranged to receive data based on a wind turbine blade design having a cross-sectional profile which varies along a longitudinal extent of the wind turbine blade, and wherein said controller is operable to adjust said at least one shaping apparatus to perform an in-line shaping of the cross-sectional profile of a part for a wind turbine blade based on said received data.

In one aspect, said at least one shaping apparatus comprises an adjustable die.

Preferably, said at least one adjustable die comprises at least one forming aperture, wherein the dimensions, shape, and/or orientation of said at least one forming aperture is adjustable.

Additionally or alternatively, said at least one shaping apparatus comprises at least one shaping tool having an adjustable guide flange.

Preferably, the part comprises a web foot for a wind turbine shear web. Preferably, the part comprises a substantially U-shaped channel to receive a web body of a shear web.

There is additionally provided a wind turbine blade having at least one part manufactured according to any aspect of the above-described method.

There is further provided a wind turbine having at least one wind turbine blade as described above.

DESCRIPTION OF THE INVENTION

Embodiments of the invention will now be described, by way of example only, with reference to the accompanying drawings, in which:

FIG. 7 illustrates

It will be understood that elements common to the different embodiments of the invention have been provided with the same reference numerals in the drawings.

Figure 1:
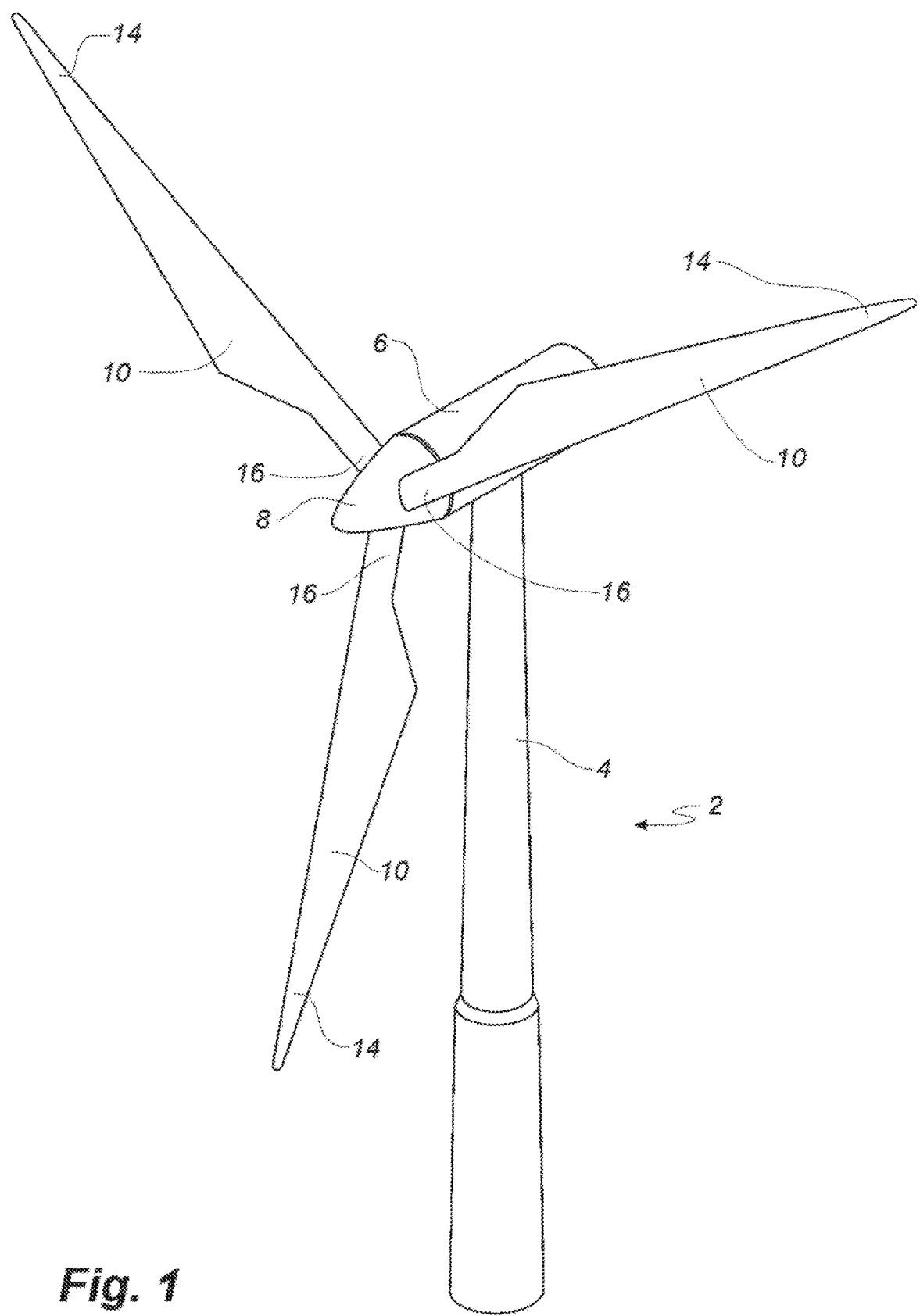
FIG. 1 shows a wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

Figure 2:
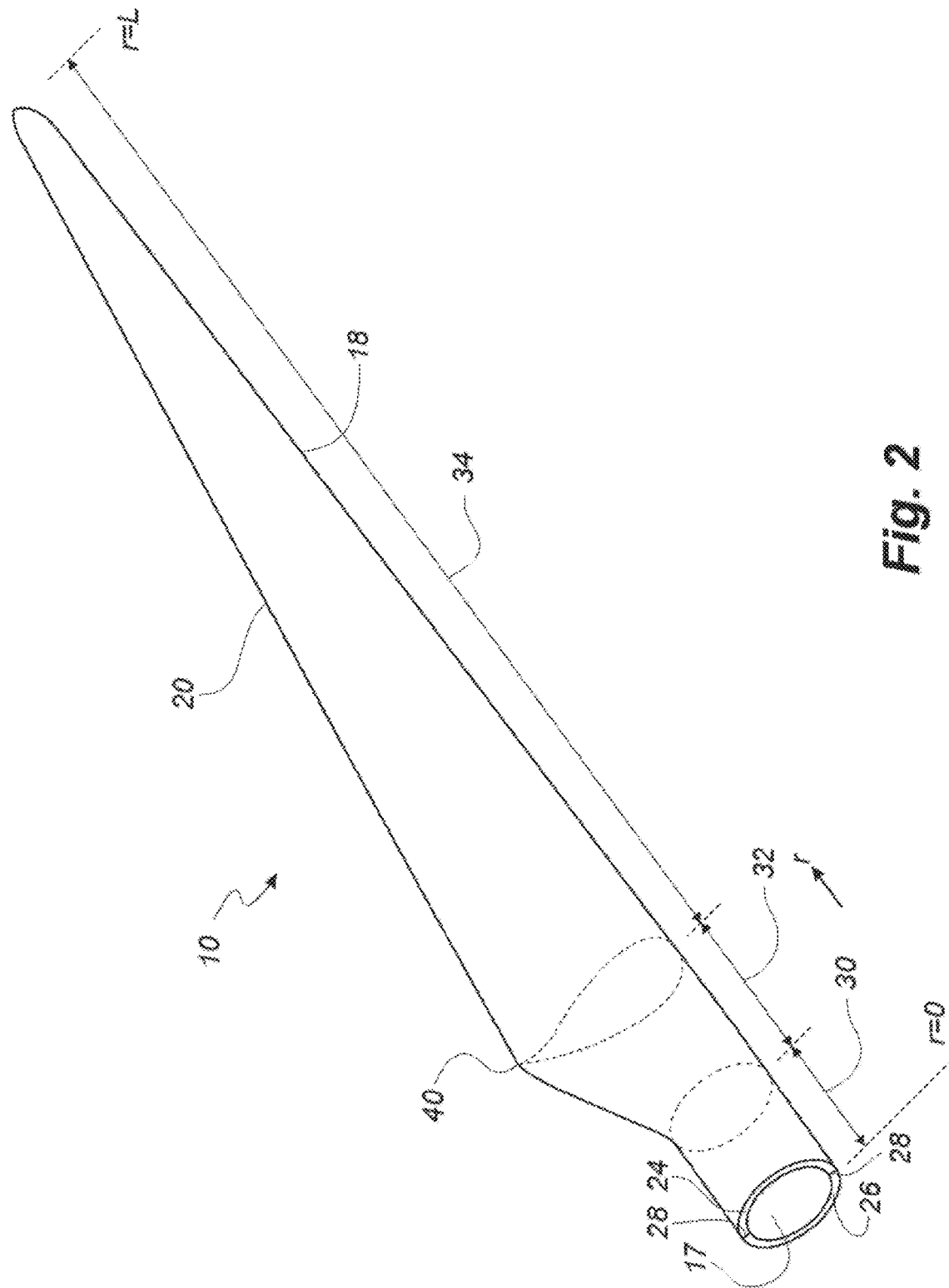
FIG. 2 shows a schematic view of a wind turbine blade according to the invention.

FIG. 2 shows a schematic view of a wind turbine blade 10. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape 40 of the root region 30 to the airfoil profile 50 of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figure 3:
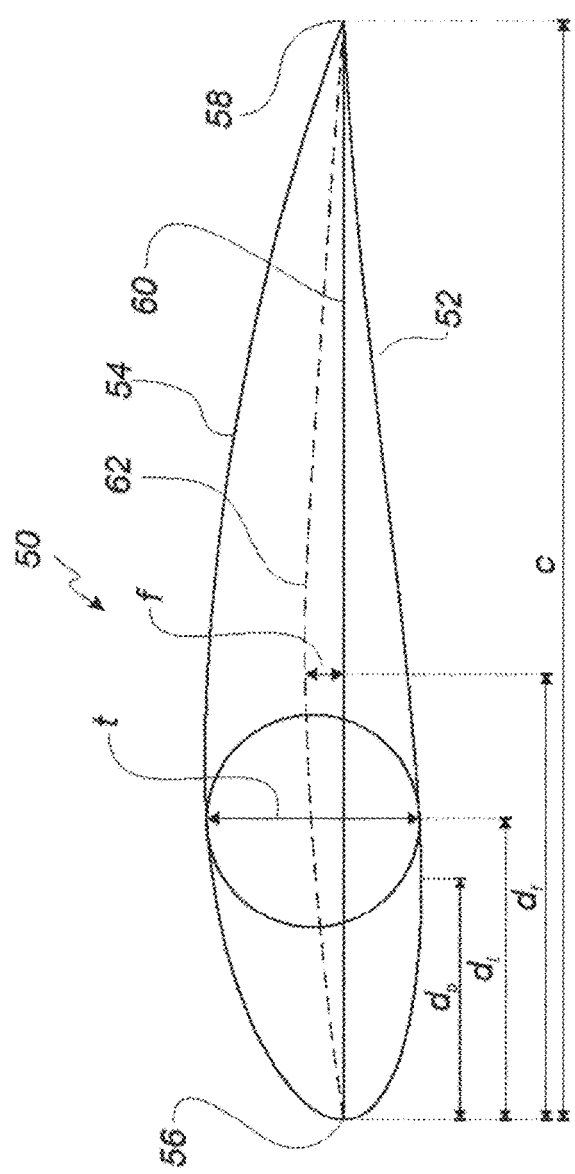
FIG. 3 shows a schematic view of an airfoil profile of the blade of FIG. 2.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

Figure 4:
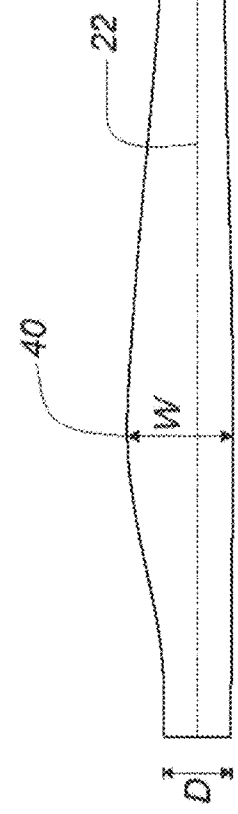
FIG. 4 shows a schematic view of the wind turbine blade of FIG. 2, seen from above and from the side.

FIG. 4 shows some other geometric parameters of the blade. The blade has a total blade length L. As shown in FIG. 2, the root end is located at position r=0, and the tip end located at r=L. The shoulder 40 of the blade is located at a position r=$L_w$, and has a shoulder width W, which equals the chord length at the shoulder 40. The diameter of the root is defined as D. Further, the blade is provided with a prebend, which is defined as Δy, which corresponds to the out of plane deflection from a pitch axis 22 of the blade.

The wind turbine blade 10 generally comprises a shell made of fibre-reinforced polymer, and is typically made as a pressure side or upwind shell part 24 and a suction side or downwind shell part 26 that are glued together along bond lines 28 extending along the trailing edge 20 and the leading edge 18 of the blade 10. Wind turbine blades are generally formed from fibre-reinforced plastics material, e.g. glass fibres and/or carbon fibres which are arranged in a mould and cured with a resin to form a solid structure. Modern wind turbine blades can often be in excess of 30 or 40 metres in length, having blade root diameters of several metres. Wind turbine blades are generally designed for relatively long lifetimes and to withstand considerable structural and dynamic loading.

In the interior of the blade 10, at least one shear web is provided, which extends between internal surfaces of the blade 10, between the pressure- and suction-sides of the blade 10. The shear webs can extend along the longitudinal direction of the blade, from an area proximate the root end to an area proximate the tip end of the blade. The shear webs provide structural rigidity and resistance to buckling for the blade structure.

Figure 5:
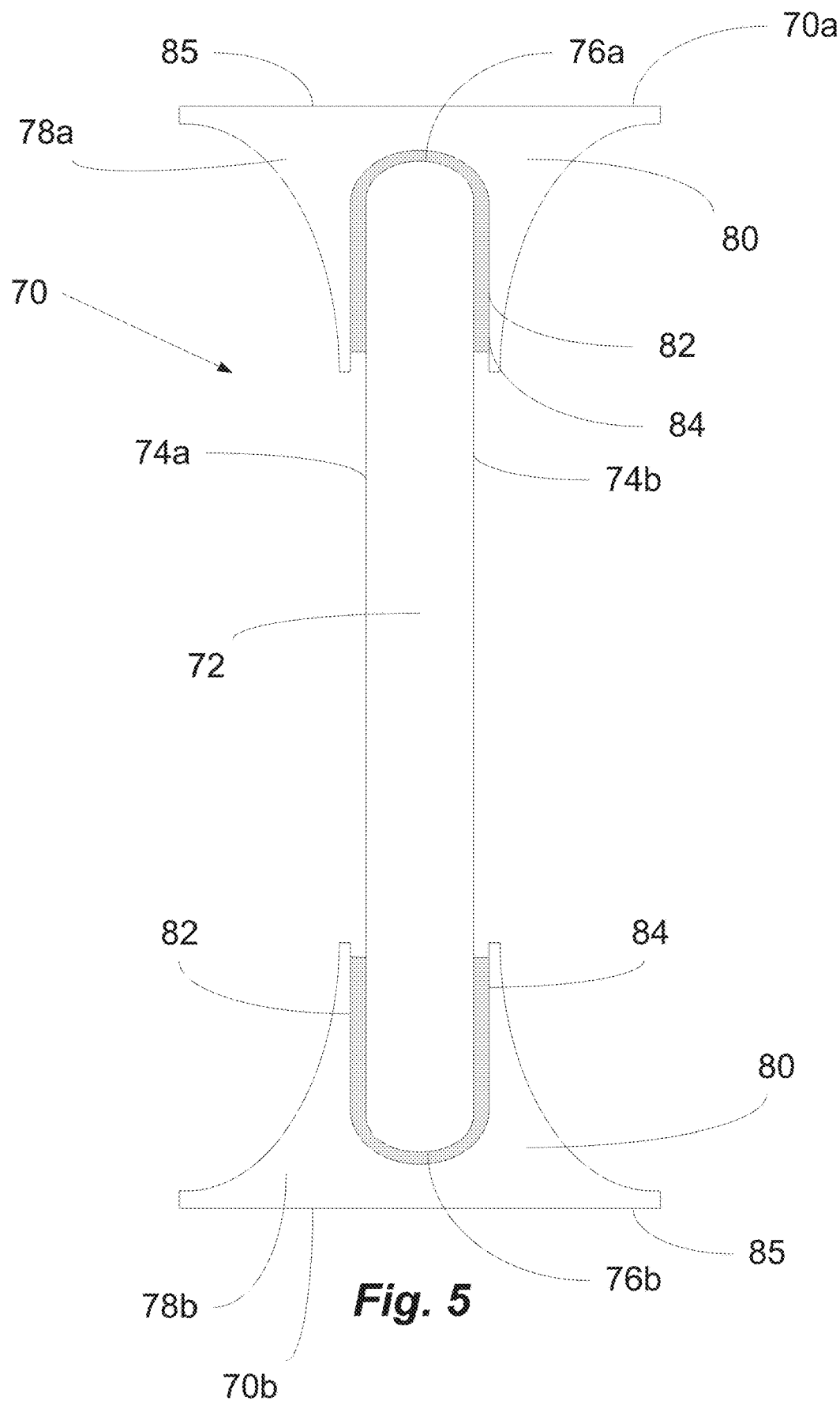
FIG. 5 illustrates a cross-sectional view of an embodiment of a shear web for use in the wind turbine blade of FIG. 2.

With reference to FIG. 5, an example of a shear web according to the invention is indicated at 70. The shear web 70 comprises a substantially planar main body 72 which extends along the length of the shear web 70. The main body 72 may be provided as a sandwich panel construction. The main body 72 comprises opposed first and second major surfaces 74a,74b, and first and second minor surfaces 76a,76b, the first and second minor surfaces 76a,76b arranged at respective upper and lower ends of the main body 72.

The shear web 70 further comprises upper and lower web foot connectors 78a,78b, coupled to the respective upper and lower ends of the main body 72 at said first and second minor surfaces 76a,76b. The web foot connectors 78a,78b each comprise a body 80 having a substantially U-shaped channel 82 defined therein, the U-shaped channel 82 arranged to receive an end of the main body 72 of the shear web 70. The main body 72 is preferably secured to the respective web foot connectors 78a,78b through an adhesive bond 84 provided in the U-shaped channel 82. Additionally or alternatively, other types of mechanical connections may be established between the main body 72 and the web foot connectors 78a,78b, e.g. a bolted connection.

The body 80 of the web foot connectors 78a,78b comprises a web flange surface 85. The web flange surface 85 forms respective primary upper and lower bonding surfaces 70a,70b of the shear web 70, when the web foot connectors 78a,78b are attached to the main body 72 of the shear web 70. The shear web 70 is attached to the internal surfaces of a wind turbine blade via said primary upper and lower bonding surfaces 70a,70b, preferably using an adhesive bond between the primary bonding surfaces of the shear web 70 and the internal surfaces of the blade. While the primary bonding surfaces 70a,70b of the shear web 70 are shown as substantially flat surfaces in FIG. 5, it will be understood that the surfaces 70a,70b may be profiled to improve bonding performance, e.g. scoring, rippled, etc.

The body 80 of the web foot connectors 78a,78b comprises side surfaces 86a,86b, which extend from opposite sides of the respective primary bonding surfaces 70a,70b to the distal ends of the U-shaped channel 82 defined on the web foot body 80. The side surfaces 86a,86b have a substantially curved profile, which is shaped to provide for effective transfer of forces between the primary bonding surfaces 70a,70b of the shear web 70 and the main web body 82.

The cross-sectional profile of the wind turbine blade 10 changes along the longitudinal length of the blade 10 from the root end 16 to the tip end 14, due to various factors such as profile thickness, airfoil shape, chord length, etc. Accordingly, the internal surfaces of the blade 10 can change in orientation at the location of the shear webs 70 used in the blade 10. To accommodate for such changes in orientation, the web foot connectors 78a,78b are configured such that the orientation of the primary bonding surfaces 70a,70b relative to the U-shaped channel 82 of the web foot connectors 78a,78b varies along the longitudinal length of the shear web 70. Accordingly, the primary bonding surfaces 70a,70b are arranged to closely follow the changing profile of the internal surfaces of the blade 10, such that the bond line between the shear web 70 and the blade internal surfaces can be accurately controlled to follow the internal geometry of the blade to have a constant bond line height, thereby ensuring a secure bond between components along the length of the wind turbine blade 10.

The web foot connectors 78a,78b are provided using a continuous forming process, e.g. a pultrusion or an extrusion process. The use of a continuous forming process allows for a manufacturing process having large-scale, which can be accurately controlled. The continuous forming process is further enhanced through the use of an in-line shaping procedure, which allows for the varying of the cross-sectional geometry of the web foot connectors 78a,78b along their length. An overview of such a process according to an aspect of the invention is shown in FIG. 6.

Figure 6:
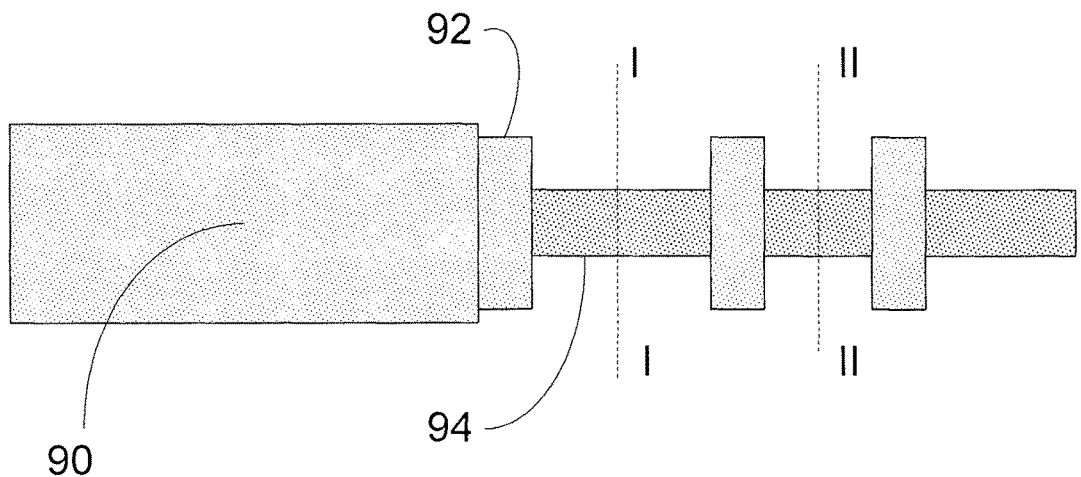
FIG. 6 shows a system for the manufacture of a part for a wind turbine blade according to the invention.

In FIG. 6, a continuous forming process, in this case a pultrusion process, is performed using suitable pultrusion apparatus 90, wherein a continuous part having a cross-sectional profile is produced by the pultrusion of fibres held in a resin matrix through a suitably-shaped pultrusion die 92. The fibres used in the pultrusion process may comprise any suitable material for use in the pultrusion process, e.g. carbon fibres, glass fibres, or a combination thereof. It will be understood that the fibres may be provided in any suitable resin material, e.g. PET, polyurethane, polyester, vinyl ester.

Figure 7A:
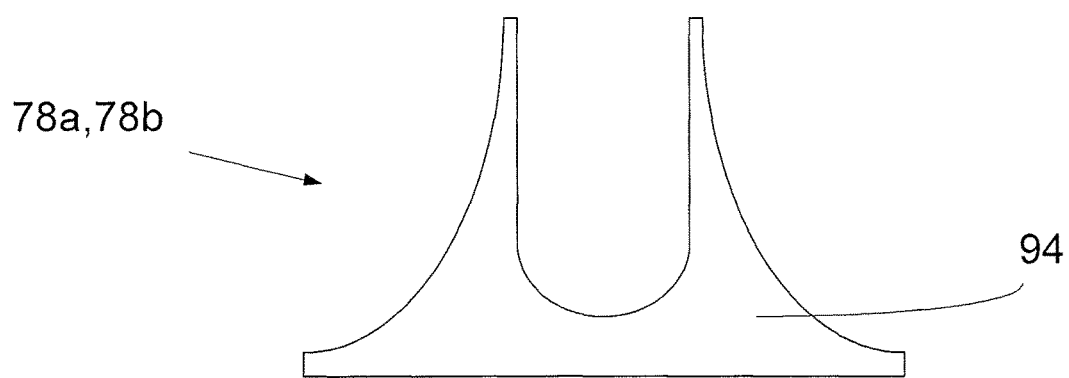
FIGS. 7A and 7B illustrate cross-sectional views of a part for a wind turbine blade manufactured by the system of FIG. 6, taken along lines I-I and II-II of FIG. 6, respectively.

In the embodiment of FIG. 6, the initial pultrusion die 92 produces a continuous part 94 having a cross-sectional profile corresponding to a web foot connector 78a,78b, as shown in cross-section I-I, FIG. 7A.

Figure 8:
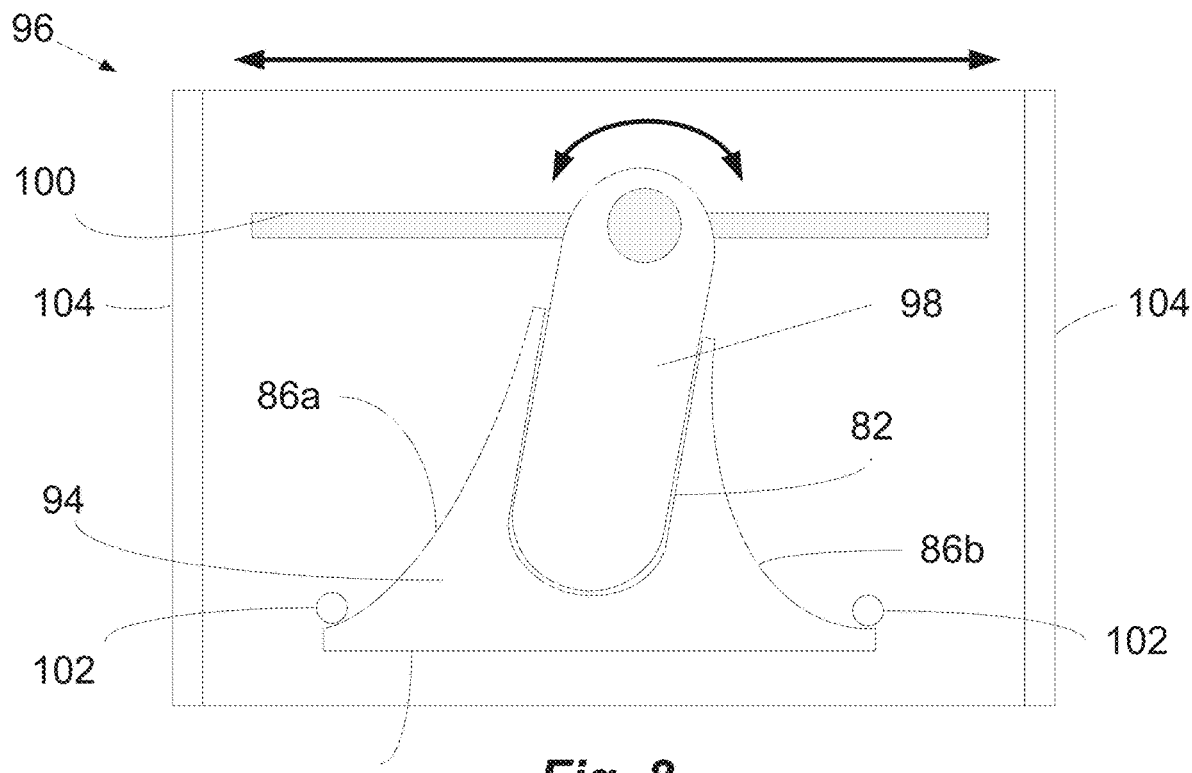
FIG. 8 illustrates a cross-sectional view of a shaping apparatus used in the system of FIG. 6.

With reference to FIG. 8, the pultruded part 94 is then passed through an in-line shaping tool 96. The shaping tool 96 comprises an adjustable guide flange 98, which is arranged to be received in the U-shaped channel 82 of the part 94. The orientation of the flange 98 can be adjusted to change the cross-sectional shape of the part 94. In the context of a web foot connector 78a,78b, the shape of the part 94 is adjusted to change the orientation of the U-shaped channel 82 relative to the primary bonding surface 70a,70b of the web foot connector 78a,78b.

The flange 98 is pivotably provided on a rail 100 and coupled with suitable actuators, such that the angular orientation and lateral displacement of the flange 98 can be adjusted, as indicated by the arrows of FIG. 8, based on the desired re-shaping of the web foot connector 78a,78b along the length of the shear web 70.

It will be understood that the shaping tool 96 may comprise a retention part configured to retain the primary bonding surface 70a,70b of the part 94, as the U-shaped channel 82 is adjusted. In the embodiment shown in FIG. 8, a rail or clamping device 102 is provided adjacent the ends of the side surfaces 86a,86b closest the primary bonding surface 70a,70b of the part 94, such that the adjustment of the U-shaped channel 82 can be performed without disturbing the orientation of the primary bonding surface 70a,70b.

The shaping tool 96 may further comprise heating elements 104 arranged to heat the part 94 to a temperature which allows for the re-shaping of the cross-sectional profile of the part 94 as it passes through the shaping tool 96. In the embodiment of FIG. 8, the heating elements 104 are arranged at opposed sides of the tool 96, so as to not impede the motion of the adjustable flange 98. Additionally or alternatively, the flange 98 may comprise an integrated heating system, e.g. embedded heating elements, to provide for a direct heating of the U-shaped channel 82 of the part 94.

Preferably, the shaping tool 96 is configured to adjust the orientation of the U-shaped channel 82 relative to the primary bonding surface 70a,70b of the part 94, such that a notional flange plane defined as the primary plane of the U-shaped channel is varied relative to a plane defined on the primary bonding surface 70a,70b of the part 94, the notional flange plane varied in the range of approximately 75-105 degrees relative to the plane defined on the bonding surface, alternatively in the range of 80-100 degrees relative to said bonding surface plane.

Figure 7B:
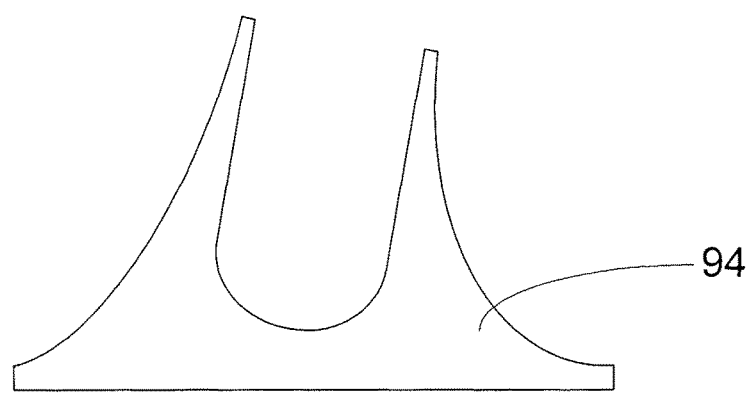
Figure 9:
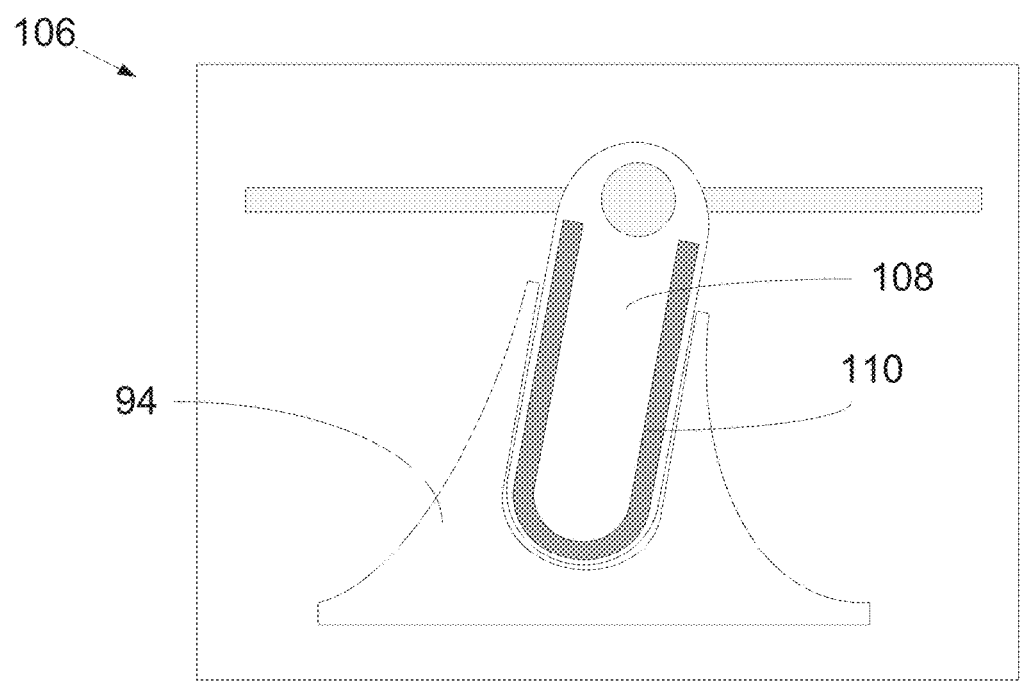
FIG. 9 illustrates a cross-sectional view of a cooling apparatus used in the system of FIG. 6.

As the part 94 exits the in-line shaping tool 96, the pultrusion comprises an adjusted cross-sectional profile, as shown in cross-section II-II, FIG. 7B. The part 94 is then passed through an in-line curing or cooling tool 106, as shown in FIG. 9. The cooling tool 106 of the embodiment is operable to cool the part 94 to harden or cure into a relatively fixed cross-sectional profile. The cooling tool 106 may comprise any suitable cooling apparatus, e.g. cooling fans arranged at opposite sides of the tool 106, to blow cooled air over the part 94. In the embodiment shown in FIG. 9, the cooling tool 106 comprises an adjustable flange 108 similar to the shaping flange 98 of the shaping tool 96, the adjustable flange 108 arranged to be received in the U-shaped channel 82 of the part 94. The flange 108 of the cooling tool 106 comprises an integrated water-cooled cooling system 110, which is arranged to directly cool the surface of the U-shaped channel 82.

Once the pultruded part 94 exits the cooling tool 106, it forms a relatively fixed longitudinally-extending part, having a varying cross-sectional profile. At this point, the part may be cut into pieces having a desired length for use in a wind turbine blade. The pieces may be provided as a single integrated part having a length corresponding to a substantial portion of the length of the blade, or the pieces may be provided as separate portions of reduced length, e.g. for transport purposes, which can be subsequently assembled into a single piece.

It will be understood that the web foot connectors produced as part of the process can be assembled into a shear web 70, by applying an adhesive into the respective U-shaped channels of the connectors and/or to the respective end of a shear web main body. The shear web main body can then be inserted into the respective U-shaped channels, and the adhesive cured to bond the web foot connectors to the main body, to form the shear web 70.

Preferably, the above-described process is performed as part of a larger blade manufacturing process, wherein the shear web 70 can be positioned on an internal surface of a blade shell, such that the variable cross-sectional profile of the web foot connectors corresponds closely with the changing geometrical profile of the internal surfaces of the blade shell, allowing for the shear web to be accurately bonded to the blade shell walls.

It will be understood that the layout of the system as shown in FIGS. 6, 8 and 9 is provided as an example, and the particulars of the system may be adjusted as required. For example, the heating of the part 94 may be performed upstream of the shaping tool 96, wherein the subsequent cooling or curing system is integrated into the shaping tool 96 itself.

In a particularly preferred embodiment, the apparatus 90 comprises a controller (not shown) arranged to control the operation of the shaping tool 96 and the cooling tool 106. The controller is arranged to receive data corresponding to the geometric shape of the wind turbine blade 10 to be manufactured. The controller is operable to determine the varying cross-sectional profile of the blade 10, and can accordingly determine the varying longitudinal profile of the internal surfaces of the blade, to which a shear web 70 is to be bonded. Based on additional process-specific requirements, e.g. blade shell thickness, desired bondline height, etc., the controller is operable to calculate the desired shear web profile needed for such a blade.

Accordingly, the controller can determine the required changes in the cross-sectional profile of the shear web 70 in the longitudinal direction of the shear web 70, and in particular the desired changes in the orientation of the primary bonding surfaces 70a,70b relative to the U-shaped channels 82 of the web foot connectors 78a,78b.

The controller is then operable to vary the in-line shaping performed on the pultruded part 94, to accurately match the desired requirements for the particular blade under construction, based on the designed geometrical profile of the blade. Such a process provides for accurate and efficient manufacturing of parts for the wind turbine blade, with minimal waste and a precisely-controlled manufacturing of suitable blade components.

Figure 10A:
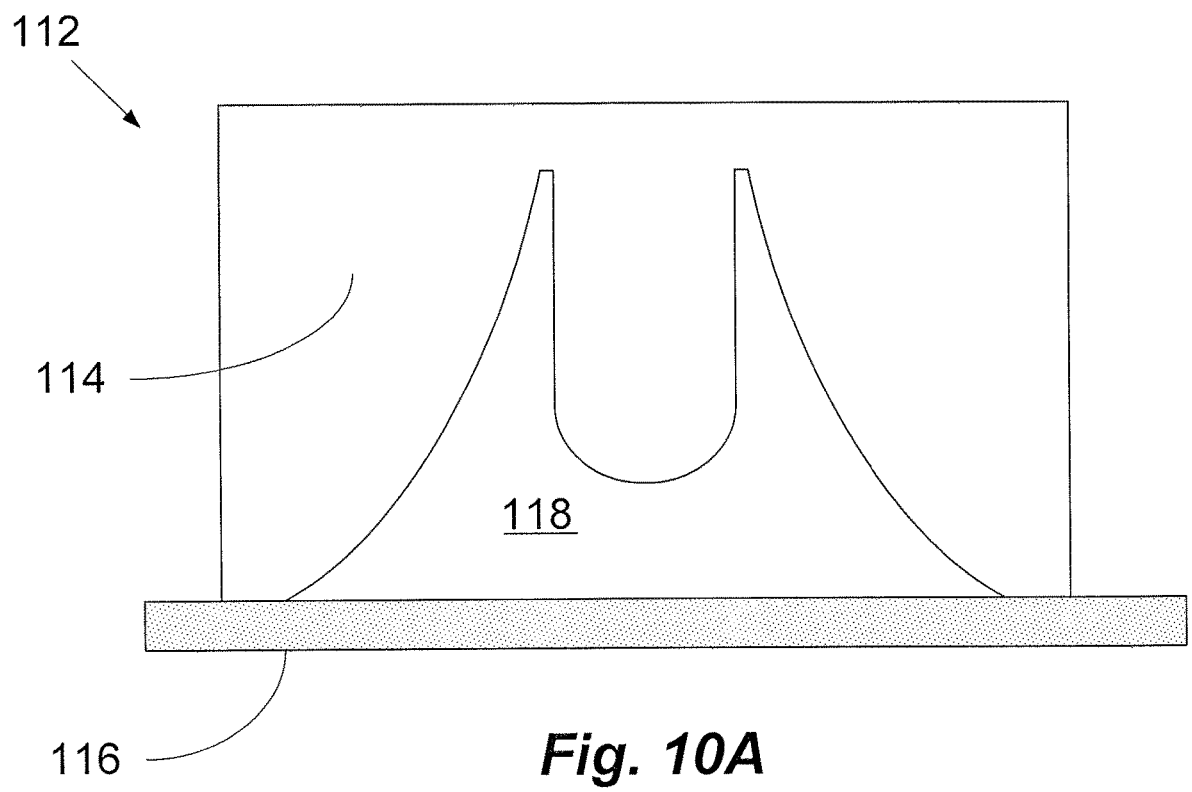
FIG. 10A illustrates a cross-sectional view of an alternative embodiment of a shaping apparatus for use in the system of FIG. 6.

The above-described embodiment of the invention utilizes an in-line shaping tool 96 having an adjustable guide flange 98. In an additional or alternative aspect of the invention, the apparatus 90 may comprise an adjustable pultrusion die, wherein the shape of the die can be varied dependent on the desired pultrusion profile. An embodiment of such an adjustable die is indicated at 112 in FIG. 10. In FIG. 10A, the adjustable die comprises a fixed die plate 114 having an edge profile generally corresponding to a first portion of a desired pultrusion profile shape, and a moveable die plate 116 having an edge profile generally corresponding to a second portion of a desired pultrusion profile shape. In use, the fixed and moveable die plates 114,116 are at least partially overlapped with one another, such that the combination of the respective edge profiles defines a die aperture 118 corresponding to the desired pultrusion cross-sectional profile.

Figure 10B:
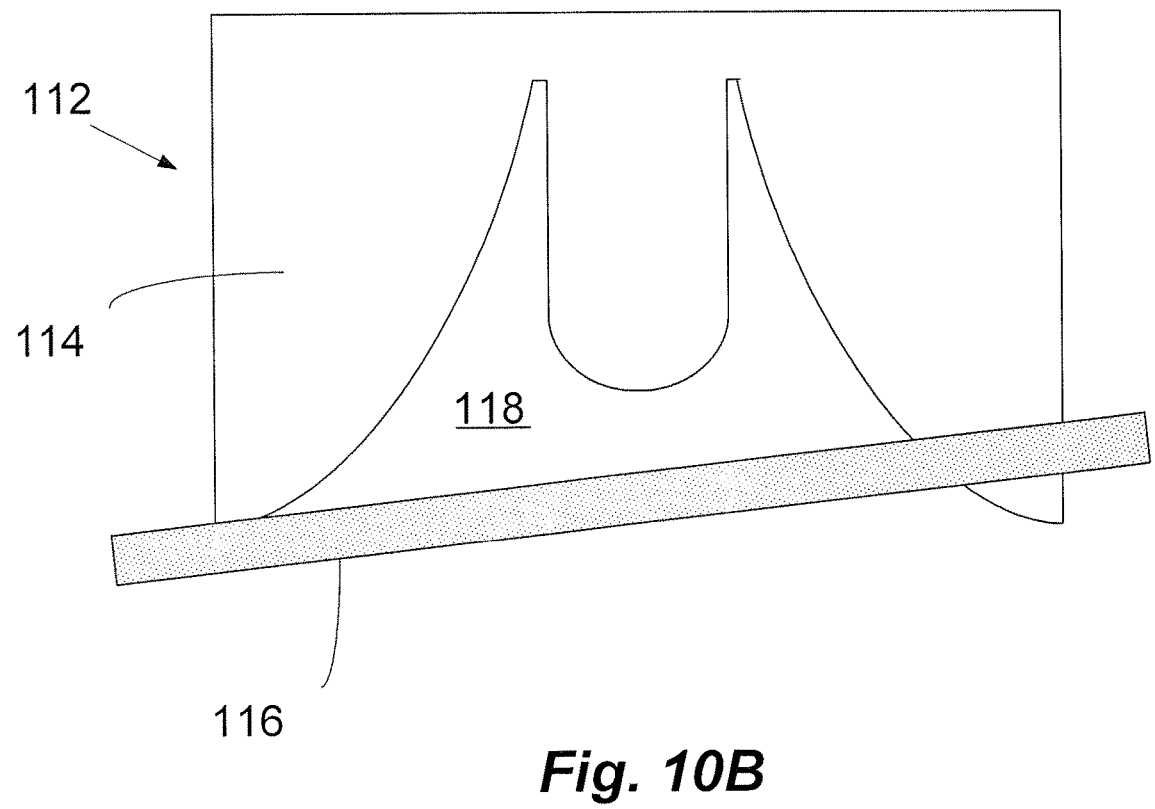
FIG. 10B illustrates a cross-sectional view of an alternative embodiment of the shaping apparatus of FIG. 10A.

With reference to FIG. 10B, during the pultrusion process, the orientation of the moveable die plate 116 may be varied relative to the fixed die plate 114, such that the die aperture 118 defined by the die plates 114,116 can be varied along the length of a part pultruded through the aperture 118.

Through the use of the above-described process, the manufacturing of parts for wind turbine blade, in particular shear webs for wind turbine blades, can be accurately controlled and mass-produced, with minimum waste, defects or quality-control issues.

The invention is not limited to the embodiments described herein, and may be modified or adapted without departing from the scope of the present invention.

The invention claimed is:

1. A method for manufacturing a part of a wind turbine blade, the part having a longitudinal length, the method comprising the steps of:
    pultruding composite material through at least one die to form a pultruded composite material having a general cross-sectional profile; and
    performing an in-line shaping of the pultruded composite material to adjust the general cross-sectional profile of the pultruded composite material along at least a portion of a longitudinal length of the pultruded composite material to form the part of a wind turbine blade,
    wherein the step of performing an in-line shaping comprises adjusting a pultrusion path for the pultruded composite material to provide the pultruded composite material with a variable cross-sectional profile which varies along the at least a portion of the longitudinal length of the pultruded composite material,
    wherein the part of the wind turbine blade comprises a web foot for a wind turbine blade shear web.

2. The method of claim 1, further comprising the step of:
    providing a guide flange downstream of the at least one die, the guide flange having a profile to define a direction of a portion of the pultrusion path,
    wherein the step of performing an in-line shaping comprises adjusting the profile and/or an orientation of the guide flange to provide the variable cross-sectional profile of the pultruded composite material which varies along the at least a portion of the longitudinal length of the pultruded composite material.

3. The method of claim 1, further comprising the step of:
    heating, the pultruded composite material to allow for the step of performing an in-line shaping of the pultruded composite material.

4. The method of claim 1, further comprising the step of:
    curing the pultruded composite material, wherein the step of curing is performed simultaneous with and/or subsequent to the step of performing an in-line shaping of the pultruded composite material.

5. The method of claim 1, wherein the at least one die comprises a pultrusion forming die arranged to produce the general cross-sectional profile of the pultruded composite material; and
    the step of performing an in-line shaping comprises using an adjustable shaping die or an adjustable guide flange to perform the step of adjusting the pultrusion path for the pultruded composite material, the adjustable shaping die or the adjustable guide flange arranged downstream of the pultrusion forming die.

6. The method of claim 5, further comprising the step of:
    providing a curing system arranged to cure or harden the pultruded composite material, the curing system arranged downstream of the adjustable shaping die or the adjustable guide flange.

7. The method of claim 5, wherein the adjustable shaping die or the adjustable guide flange comprises an integrated curing system for curing or hardening the pultruded composite material.

8. The method of claim 1, wherein the web foot comprises:
    a U-shaped channel defined along a channel plane; and
    a flange defined along a flange plane, wherein the flange plane is arranged transversely with respect to the channel plane.

9. The method of claim 8, wherein the step of adjusting of the pultrusion path for the pultruded composite material comprises adjusting the pultrusion path such that an angle of the flange plane varies relative to an angle of the channel plane along the at least a portion of the longitudinal length of the pultruded composite material.

10. A method of manufacturing at least a portion of a wind turbine blade, the method comprising the steps of:
    manufacturing a web foot for a wind turbine blade shear web by performing the method as claimed in claim 1;
    providing a wind turbine blade shell; and
    attaching the web foot for a wind turbine blade shear web to the wind turbine blade shell to form the at least a portion of a wind turbine blade.

* * * * *